3,150,048
NAIL LACQUER REMOVING PREPARATIONS
Jean Hollub, Milan, Italy, and Arthur Maeder, Therwil, Switzerland, assignors to Ciba Limited, Basel, Switzerland, a Swiss firm
No Drawing. Filed Mar. 9, 1959, Ser. No. 797,843
Claims priority, application Switzerland, Mar. 21, 1958, 57,312
4 Claims. (Cl. 167—85)

Various proposals have been made for preventing the leaching and whitening of finger nails treated with the known liquid nail lacquer removers, due to the action of the organic solvents customarily used. Thus, it has been proposed to homogenize the lacquer solvent with an emulsion of a wax, oil or fat prepared with the use of soap or an emulsifier as emulsion carrier. However, this expedient does not sufficiently counteract the extraction of fat from the finger nails and matting of the nails.

The present invention is based on the observation that by incorporating with the lacquer solvent a small proportion of an internally plasticized polymer or copolymer, more especially of an ester of an at least copolymerizable carboxylic acid, such as acrylic acid, or of an ester of an at least copolymerizable alcohol, such as vinyl alcohol, not only is the defatting of the nails reduced to an extent not achieved hitherto, but there is also produced on the treated nail an extremely thin film having a mother-of-pearl lustre which gives the nail a very pleasing appearance.

Accordingly, the present invention provides a nail lacquer removing preparation, which comprises an organic solvent for lacquer and a small proportion of an internally plasticized polymer or copolymer, preferably of an ester of an at least copolymerizable carboxylic acid with an alcohol or a phenol, or of an ester of an at least copolymerizable alcohol with a carboxylic acid, and, if desired, a lipophilic ingredient, wetting and/or dispersing agent or a thickener.

As lacquer solvents there may be used the water-soluble or sparingly soluble or water-insoluble organic solvents customarily used for dissolving nail lacquers, especially nitro cellulose nail lacquers, such as acetone, methyl ethyl ketone, ethyl acetate, isopropyl acetate, butyl acetate, amyl acetate, benzyl acetate, methylglycol acetate or ethyl glycol acetate.

These active solvents may also contain a small proportion of another organic solvent as diluent, such as toluene, a chlorinated hydrocarbon or benzine.

The internally plasticized polymers or copolymers present in the preparations of the invention are preferably those of esters of at least copolymerizable acid, such as crotonic acid, maleic acid, fumaric acid, furylacrylic acid, methacrylic acid, $\alpha$-chloracrylic acid, ethacrylic acid or more especially acrylic acid. Among the alcohols or phenols from which these esters may be derived may be mentioned for example, those of the aliphatic series such as methanol, ethanol, propanol, isobutanol, 2-ethylbutanol, hexyl, heptyl, octyl, or octadecyl alcohol; those of the alicyclic series such as cyclohexanol and methyl cyclohexanol; phenols such as phenol itself and nuclear substitution products thereof such as halogen phenols or cresols, and also naphthols; alcohols of the araliphatic series such as benzyl alcohol; and those of the heterocyclic series such as furfuryl and tetrahydrofurfuryl alcohol. Mixtures of two or more such esters may also be used.

Alternatively, the internally plasticized polymers or copolymers may be those of esters of an at least copolymerizable alcohol, especially vinyl alcohol. Among the carboxylic acids from which these esters may be derived may be mentioned, for example: those of the aliphatic series such as acetic, propionic, butyric, valeric, caproic, capric, lauric, myristic, palmitic, stearic and oleic acid; those of the aromatic series such as benzoic acid and nuclear substitution products thereof; and also naphthalene carboxylic acid; those of the araliphatic series, such as phenylacetic and cinnamic acid; and those of the heterocyclic series, such as pyromucic acid and tetrahydrofurane carboxylic acid.

It is especially advantageous to use homopolymers or copolymers of esters of methacrylic acid or acrylic acid with a lower aliphatic alcohol, such as methyl methacrylate, ethyl methacrylate, methyl acrylate, ethyl acrylate, isopropyl acrylate or butyl acrylate. There can also be used with special advantage homopolymers or copolymers of esters of vinyl alcohol with a higher fatty acid, such as vinyl caproate, vinyl laurate, vinyl myristate, vinyl palmitate or vinyl stearate.

The copolymers can be made by copolymerizing an ester of an at least copolymerizable acid or of an at least copolymerizable alcohol with another compound unsaturated at one or more positions.

Compounds of the latter kind are more especially those which contain the atomic grouping $CH_2=C<$, such as vinyl esters of organic acids, for example, vinyl acetate, vinyl formate, vinyl butyrate or vinyl benzoate, and also vinyl alkyl ketones, vinyl halides such as vinyl chloride, vinyl fluoride, vinylidene chloride, vinyl-aryl compounds such as styrene and substituted styrenes; also compounds of the acrylic acid series such as acrylic acid, methacrylic acid, esters of acrylic acid and with an alcohol or phenol, which contain amino groups or quaternary ammonium groups such, for example, as $\beta$-diethylaminoethyl acrylate, acrylonitrile or acrylic acid amide and its derivatives substituted at the amide nitrogen atom, which may contain basic amino groups or quaternary ammonium groups such, for example, as N-tertiary butyl-acrylic acid amide or N-diethylaminopropyl acrylic acid amide; and also analogous derivatives of methacrylic, $\alpha$-chloracrylic, crotonic, maleic or fumaric acid. There may also be used polymerizable olefines such as isobutylene, butadiene, 2-chlorobutadiene or heterocyclic compounds containing at least one vinyl group, such as vinyl-pyridine. There may also be used homopolymers or copolymers of esters of an at least copolymerizable carboxylic acid whose ester groups have been partially hydrolyzed.

It is of advantage to use those polymers or copolymers of the kind defined above which are soluble in the lacquer solvent used.

It is of advantage to use about 0.5 to 5% and preferably 0.5 to 2% of the polymer or copolymer calculated on the total weight of the nail lacquer removing preparation.

The nail lacquer removing preparations of the invention may be in liquid form, for example as a simple solution of a small proportion, for example, 1 to 5% of a polymer or copolymer defined above in a lacquer solvent or a mixture of lacquer solvents. In a preferred form of the invention the nail lacquer removing preparation is in the form of a paste prepared by homogenizing a solution of the polymer or copolymer in the lacquer solvent with a lipophilic ingredient and/or a thickener. Advantageously a wetting or dispersing agent is added which ensures the formation of a stable, homogeneous nail lacquer removing preparation. If desired, water may also be added prior to the homogenization, so that either an oil-in-water or a water-in-oil emulsion is obtained depending on the ratio of the water to lipophilic ingredients.

Suitable lipophilic ingredients are hydrocarbons such as white petroleum jelly or parafin wax, polyethylene glycol, vegetable or animal fats or oils such as olive oil, castor oil, almond oil and more especially fat-restoring fatty acid esters, such as isopropyl palmitate or isopropyl myristate.

Suitable wetting or dispersing agents are anion-active compounds such as soaps, fatty alcohol sulfates, sulfonated oils, alkylaryl sulfonates or the like, and also non-ionic wetting and emulsifying agents, such as condensation products of ethylene oxide with higher alcohols, alkyl phenols or mercaptans.

Suitable thickening agents are tragacanth, methyl cellulose, ethyl cellulose, sodium alginate and more especially finely divided $SiO_2$ (trademark "Aerosil"; manufactured by Degussa Aktiengesellschaft, Frankfurt am Main, Germany). The use of finely divided $SiO_2$ in a suitable proportion (about 1 to 10% on the total weight of the preparation) has the special advantage that the nail lacquer removing preparation can be prepared with the use of lipophilic ingredients in the form of a semi-transparent jelly. To enhance the gloss of the cleaned finger nail there may also be added to the nail lacquer removing preparation a small proportion of a silicone oil. There may be mentioned, for example, the "silicone oil type 300" consisting essentially of methyl-poly-siloxanes which is manufactured and supplied by Farbenfabriken Bayer, Aktiengesellschaft, Leverkusen, Germany.

Finally, the nail lacquer removing preparation may contain additives of the kind customarily incorporated in cosmetics, such as perfume, dyestuffs or the like.

The following examples illustrate the invention, the parts being by weight:

*Example 1*

A nail varnish removing preparation in the form of a semi-transparent jelly is prepared by homogeneously mixing together the following ingredients:

|  | Parts |
|---|---|
| Almond oil | 7.5 |
| Petrolatum | 15.0 |
| Acrylic resin solution | 4.5 |
| Alkylnaphthalene sulfonate | 3.0 |
| Acetone | 60.0 |
| Amyl acetate | 12.0 |
| Finely dispersed $SiO_2$ (trademark "Aerosil") | 8.0 |

The acrylic resin solution was prepared by dissolving 24.5 parts of poly-n-butylacrylate in a mixture of 10.5 parts of nitrocellulose, 6 parts of n-butanol, 36.5 parts of ethyl acetate and 22.5 parts of n-butylacetate.

*Example 2*

A nail varnish remover in the form of a translucent jelly is prepared by homogeneously mixing together the following ingredients:

|  | Parts |
|---|---|
| Almond oil | 7.5 |
| Isopropyl myristate | 1.5 |
| Petrolatum | 17.30 |
| Acrylic resin solution (as in Example 1) | 2.0 |
| Alkylnaphthalene sulfonate | 2.7 |
| Acetone | 50.0 |
| Amyl acetate | 14.0 |
| Finely dispersed $SiO_2$ (trademark "Aerosil") | 9.0 |

*Example 3*

A nail varnish remover in the form of a jelly is prepared by homogeneously mixing together the following ingredients:

|  | Parts |
|---|---|
| Castor oil | 5.0 |
| Isopropyl palmitate | 2.0 |
| Petrolatum | 13.0 |
| Solution of an acrylic resin polymer | 4.0 |
| Condensation product from 8 mols of ethylene oxide and 1 mol of para-octylphenol | 4.0 |
| Methylal | 36.0 |
| Ethyl acetate | 25.0 |
| Methylene chloride | 4.0 |
| Finely dispersed $SiO_2$ (trademark "Aerosil") | 7.0 |
| Perfume | 0.5 |

The solution of the acrylic resin copolymer was prepared in the following manner:

A mixture of 48 parts of ethyl acrylate, 36 parts of methyl methacrylate, 24 parts of tertiary butylacrylamide, 9.05 parts of N-($\gamma$-diethylaminopropyl)-acrylamide and 180 parts of isopropanol is copolymerized for 6 hours, during which a total of 1.2 parts of lauroyl peroxide and 0.4 part of $\alpha:\alpha'$-azoisobutyro-dinitrile is added in portions.

250 parts of the resulting resin solution are mixed with a solution of 3.25 parts of solid potassium hydroxide of 86% strength in 250 parts of isopropanol and hydrolyzed for 3 hours at 80° C., with stirring under reflux. The reaction solution is allowed to cool to 20 to 25° C., filtered, and concentrated by distilling off the solvent at about 110° C. bath temperature with stirring until a resin content of 50% is reached.

5.2 parts of the resin solution of 50% strength described above are then neutralized with 0.09 part of lactic acid of 100% strength.

*Example 4*

A nail varnish remover in the form of a cream is prepared by homogeneously mixing together the following ingredients:

|  | Parts |
|---|---|
| Silicone oil (type 300, manufactured by Farbenfabriken Bayer A.G.) | 0.5 |
| Polyethylene glycol (Carbowax 4000) | 4.2 |
| Castor oil | 3.0 |
| Stearin | 15.0 |
| Acrylic resin solution according to Example 1 | 2.0 |
| Mixture of: 60 parts pine oil / 30 parts olein / 6.6 parts potassium hydroxide / 3.4 parts water | 5.5 |
| Ethyl acetate | 34.0 |
| Butyl acetate | 9.5 |
| Methylethyl ketone | 17.0 |
| Ammonia, 28% strength | 3.8 |
| Distilled water | 4.0 |
| Finely dispersed $SiO_2$ (trademark "Aerosil") | 1.5 |

*Example 5*

A nail varnish remover in the form of a cream is prepared by homogeneously mixing together the following ingredients:

|  | Parts |
|---|---|
| Silicone oil (type 300, manufactured by Farbenfabriken Bayer A.G.) | 0.5 |
| Polyethylene glycol (Carbowax 4000) | 8.0 |
| Castor oil | 3.0 |
| Stearin | 15.0 |
| Acrylic resin solution | 2.0 |
| Condensation product from 8 mols of ethylene oxide and 1 mol of para-octylphenol | 4.5 |
| Ethyl acetate | 34.0 |
| Butyl acetate | 10.0 |
| Methylal | 17.0 |
| Monoethanolamine | 4.0 |
| Finely dispersed $SiO_2$ (trademark "Aerosil") | 2.0 |

The acrylic resin solution was prepared by dissolving 40 parts of a copolymer from equal parts of n-butylacrylate and vinyl acetate in 60 parts of ethyl acetate.

*Example 6*

A nail varnish remover was prepared as described in Example 1, except that the acrylic resin solution was obtained by dissolving 24.5 parts of poly-methyl-methacrylate in a mixture of 36.5 parts of ethyl acetate and 22.5 parts of n-butylacetate.

*Example 7*

A nail varnish remover was prepared as described in Example 1, except that the acrylic resin solution was obtained by dissolving 24.5 parts of poly-methyl-methacrylate in a mixture of 36.5 parts of ethyl acetate, 22.5 parts of n-butylacetate and 2.45 parts of dioctyl phthalate.

*Example 8*

A nail varnish remover was prepared as described in Example 1, except that instead of the acrylic resin solution there was used a vinyl resin solution obtained by dissolving 24.5 parts of a copolymer consisting of 80 parts of polyvinyl acetate and 20 parts of polyvinyl stearate in a mixture of 36.5 parts of ethyl acetate and 22.5 parts of n-butyl acetate.

What is claimed is:

1. A stable homogeneous nail-lacquer removing preparation in the form of a paste which comprises
   (1) a cosmetically acceptable solvent selected from the group consisting of acetone, methyl ethyl ketone, ethyl acetate, isopropyl acetate, butyl acetate, amyl acetate, benzyl acetate, methylglycol acetate and ethyl glycol acetate,
   (2) 0.5 to 5% calculated on the total weight of the preparation of a copolymer of ethyl acrylate, methyl methacrylate, N-(γ-diethylaminopropyl)-acrylic acid amide and N-tertiary-butyl acrylic acid amide, and
   (3) at least one member selected from the group consisting of white petroleum jelly, paraffin wax, polyethylene glycol, olive oil, petrolatum, castor oil, almond oil, isopropyl palmitate and isopropyl myristate,
   (4) a nonionic surface active agent and
   (5) finely dispersed $SiO_2$.

2. A preparation as claimed in claim 1, wherein the non-ionic surface active agent is a condensation product from ethylene oxide and an alkyl-phenol.

3. A stable homogeneous nail-lacquer removing preparation in the form of a paste which comprises
   (1) a cosmetically acceptable solvent selected from the group consisting of acetone, methyl ethyl ketone, ethyl acetate, isopropyl acetate, butyl acetate, amyl acetate, benzyl acetate, methylglycol acetate and ethyl glycol acetate,
   (2) 0.5 to 5% calculated on the total weight of the preparation of a copolymer of n-butylacrylate and vinyl acetate, and
   (3) at least one member selected from the group consisting of white petroleum jelly, paraffin wax, polyethylene glycol, olive oil, petrolatum, castor oil, almond oil, isopropyl palmitate and isopropyl myristate,
   (4) a nonionic surface active agent and
   (5) finely dispersed $SiO_2$.

4. A stable homogeneous nail-lacquer removing preparation in the form of a paste which comprises
   (1) a cosmetically admissible solvent selected from the group consisting of acetone, methyl ethyl ketone, ethyl acetate, isopropyl acetate, butyl acetate, amyl acetate, benzyl acetate, methylglycol acetate and ethyl glycol acetate,
   (2) 0.5 to 5% calculated on the total weight of the preparation of a copolymer of polyvinyl acetate and polyvinyl stearate, and
   (3) at least one member selected from the group consisting of white petroleum jelly, paraffin wax, polyethylene glycol, olive oil, petrolatum, castor oil, almond oil, isopropyl palmitate and isopropyl myristate,
   (4) an anion-active dispersing agent and
   (5) finely dispersed $SiO_2$.

References Cited in the file of this patent

UNITED STATES PATENTS

| | | |
|---|---|---|
| 2,195,971 | Peter | Apr. 2, 1940 |
| 2,286,687 | Ochs | June 16, 1942 |
| 2,525,303 | Lenoble | Oct. 10, 1950 |
| 2,566,716 | Boe | Sept. 4, 1951 |
| 2,613,156 | McGaffin | Oct. 7, 1952 |
| 2,647,060 | Armstrong | July 28, 1953 |
| 2,764,168 | Herz | Sept. 25, 1956 |
| 2,804,073 | Gallienne | Aug. 27, 1957 |

FOREIGN PATENTS

| | | |
|---|---|---|
| 656,264 | Great Britain | Aug. 15, 1951 |

OTHER REFERENCES

Harry: Modern Cosmeticology, Leonard Hill Ltd., London, 4th ed., 1955, pp. 617–620.